Dec. 18, 1951 R. A. ARTHUR 2,578,773
CONTROL FOR CABIN PRESSURE REGULATORS
Filed April 20, 1948 3 Sheets-Sheet 1

INVENTOR
ROBERT A. ARTHUR
BY
ATTORNEY

Dec. 18, 1951  R. A. ARTHUR  2,578,773
CONTROL FOR CABIN PRESSURE REGULATORS
Filed April 20, 1948  3 Sheets-Sheet 2
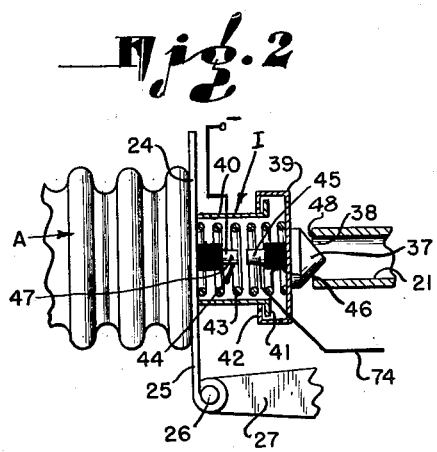
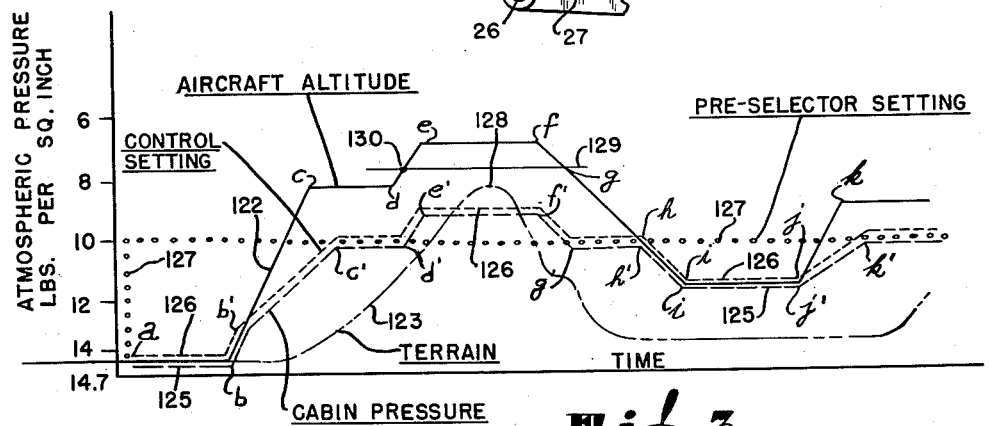
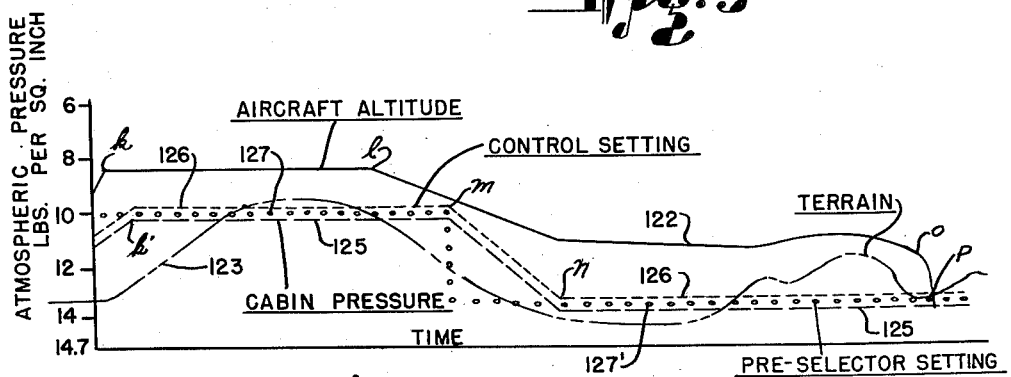
INVENTOR
ROBERT A. ARTHUR
BY
ATTORNEY Dec. 18, 1951      R. A. ARTHUR      2,578,773
CONTROL FOR CABIN PRESSURE REGULATORS
Filed April 20, 1948      3 Sheets-Sheet 3
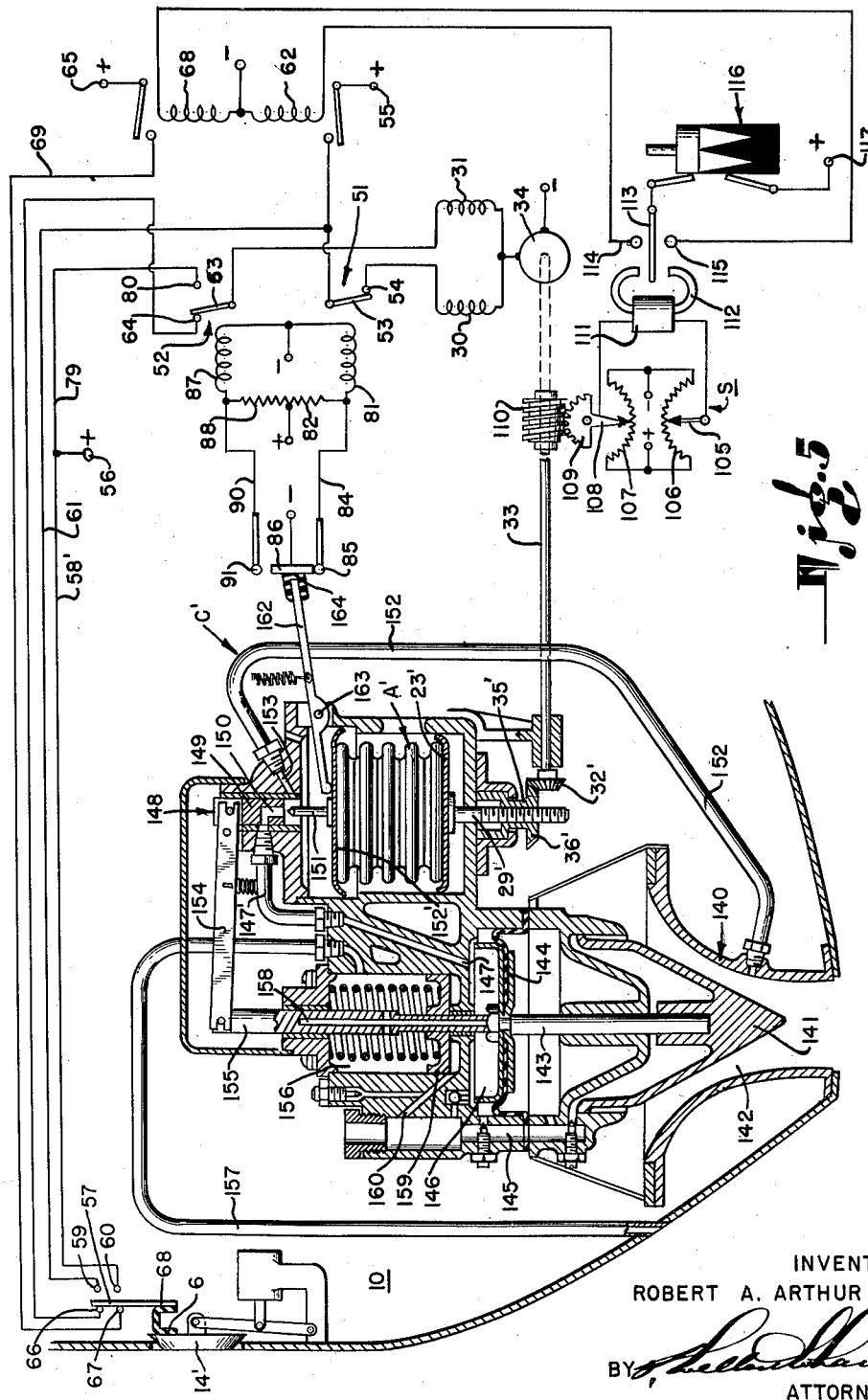
INVENTOR
ROBERT A. ARTHUR
BY
ATTORNEY Patented Dec. 18, 1951

2,578,773

UNITED STATES PATENT OFFICE 2,578,773

CONTROL FOR CABIN PRESSURE REGULATORS

Robert A. Arthur, Los Angeles, Calif., assignor to The Garrett Corporation, Los Angeles, Calif., a corporation of California Application April 20, 1948, Serial No. 22,196

23 Claims. (Cl. 98—1.5)

1

This invention relates to devices for controlling pressure in aircraft cabins or compartments, and relates in particular to a regulating means which may be embodied in cabin pressure control devices of various types, including pneumatic, electrical, hydraulic and mechanical.

It is an object of the invention to provide a control apparatus for aircraft cabins or compartments having a cabin pressure regulator commonly referred to as a variable isobaric regulator for maintaining a pressure in the cabin independently of an existing ambient pressure outside the cabin, and having means for adjusting this regulator into correspondence with ambient atmospheric pressure when a prescribed condition or prescribed conditions exist or develop. The conditions under which the setting of the isobaric regulator is automatically brought into correspondence with ambient atmospheric pressure may include one or all of the following:

(1) When the aircraft is standing on the ground.

(2) When the aircraft lands from flight.

(3) When the air pressure dump valve of the cabin is opened.

(4) When the cabin air supply equipment of the aircraft, for example, the supercharger, fails to function.

(5) When the pressure in the cabin departs a predetermined amount from the pressure for which the isobaric regulator has been set.

It is an object of the invention to provide a pressure regulator for aircraft cabins having an isobaric control and a preselector for gradually changing the setting of this control, and means for rendering the preselector inoperative under certain conditions. A valuable utility of the invention will be perceived from the following. Prior to the take-off, the pilot may set his preselector for the isobaric pressure which he may desire to maintain in the cabin, even though the aircraft flies to and in a zone of lower pressure. However, the preselector will not accomplish a gradual setting of the isobaric regulator until a time after the aircraft has left the ground, and until the overriding control which is under supervision of the pilot, is turned off, the pressure of the cabin and the adjustment of the isobaric regulator will be in correspondence with ambient atmosphere. Thereafter, when the pilot turns off the overriding control, the preselector will gradually change the cabin pressure until the preselected isobaric level has been reached, even though the aircraft has rapidly proceeded into the zone of ambient atmospheric pressure less than the cabin isobaric pressure level. In this way,

2 the device avoids sudden change in cabin pressure and keeps the change in cabin pressure within a rate avoiding discomfort or injury to the passengers occupying the cabin.

A further object of the invention is to provide a control for cabin pressure, operative when the aircraft is ascending at a rate less than the cabin pressure changing rate of the preselecting mechanism, to maintain the adjustment of the isobaric control mechanism in correspondence with ambient atmosphere. That is to say, if, for example, the pressure changing equipment associated with the preselector is adjusted to change the setting of the isobaric control at a rate of three hundred feet of altitude per minute, but the actual ascent of the aircraft is at a lower rate, for example, one hundred feet of altitude per minute, the adjustment of the isobaric control will be kept in correspondence with ambient atmosphere, and thereafter, should the aircraft subsequently ascend at a greater rate, for example, five or six hundred feet of altitude per minute, the regulation of the isobaric control will be limited to a rate of change corresponding to three hundred feet of altitude per minute, thereby avoiding a pressure change in the cabin which would be outside the so-called "physiological" rate. It is not meant, by the use of the term "correspondence" with relation to cabin pressure, and also with relation to the instant setting of the cabin pressure isobaric control, for example, that the setting of the isobaric control and the pressure existing in the cabin are exactly that of ambient atmospheric pressure, but that the values thereof are within a small range of departure from actual ambient atmospheric pressure. For example, the setting of the isobaric control may at this time be for a pressure slightly less than atmospheric pressure outside the aircraft and the value of the cabin pressure may be slightly greater than ambient atmospheric pressure, within the range of one-tenth to one-quarter pounds per square inch, which, for the practical purposes hereof, is in correspondence with ambient atmosphere.

The present invention compensates for a number of abnormal conditions of flight. For example, the pilot may elect to take the aircraft up to a cooler altitude before beginning pressurization of the cabin. During such ascent, he would keep the dump valve or pressure regulator valve of the cabin open so as to permit a free unpressurized circulation of air. Normally, the isobaric changer mechanism associated with the isobaric control would adjust the isobaric level upwardly at the rate set upon the isobaric changer mechanism until the setting of the control corresponded to the preselected isobaric level. Then, when the air valves of the aircraft cabin were abruptly closed, the cabin would be immediately pressurized, and such immediate pressurization would subject the passengers to the discomfort and possible injury due to implosive compression. With the present control, however, such sudden compression cannot occur, for the reason that until the valves of the aircraft cabin are closed, the setting of the adjustable isobaric control will be maintained in correspondence with ambient atmospheric pressure.

There are times when it becomes necessary for the pilot to fly the aircraft below the isobaric level for which the cabin pressure control has been set, for example, to fly under bad weather or under a cloud formation. After such descent, the pilot may desire to quickly return to his original altitude or to a higher altitude in order to pass over mountains. An object of the invention is to provide means whereby the adjustable isobaric control is automatically adjusted downwardly when the aircraft drops below the isobaric level for which the control is set, in correspondence with the increase in ambient atmospheric pressure encountered by the aircraft as it descends, and then brings the adjustment of the isobaric control back to the isobaric level at a physiologically desirable rate, even though the aircraft may rapidly ascend from a point below to a point above the preselected isobaric level.

Also, it may be necessary for the aircraft to land at an altitude below the preselected isobaric level and to descend at a rate which is greater than the normal rate of change of the rate of change mechanism associated with the isobaric preselector. An object of the invention is to provide means which will act automatically under such circumstances to adjust the isobaric control in correspondence to ambient atmospheric pressure.

It is a further object of the invention to provide a control device of the character described herein having differential control means and means operating automatically if the safe differential between ambient atmospheric pressure and cabin pressure is exceeded, to adjust the isobaric control in a manner to maintain adjustment of the control at or below a predetermined maximum differential value with relation to ambient atmospheric pressure.

Further objects and advantages of the invention will be brought out in the following part of the specification, wherein preferred embodiments of the invention have been described for the purpose of making a detailed disclosure without limiting the scope of the invention which is set forth in the appended claims. Herein the term "air" is to be used in its literal sense as including gaseous matter and gas, and the term "cabin" is used in its broad sense as meaning a compartment or enclosed space in a craft, rocket or jet propelled missile or projectile, for in these, even though they may carry no personnel, there is also need for controlled pressurization.

Referring to the drawings which are for illustrative purposes only:

Fig. 2 is a sectional view to enlarged scale of switch means associated with control valves of the device shown in Fig 1.

Fig. 3 is a flight diagram and Fig. 4 is a flight diagram continuing the flight started in Fig. 3.

Fig. 5 is a schematic view showing an alternative form of the invention.

Figure 1:
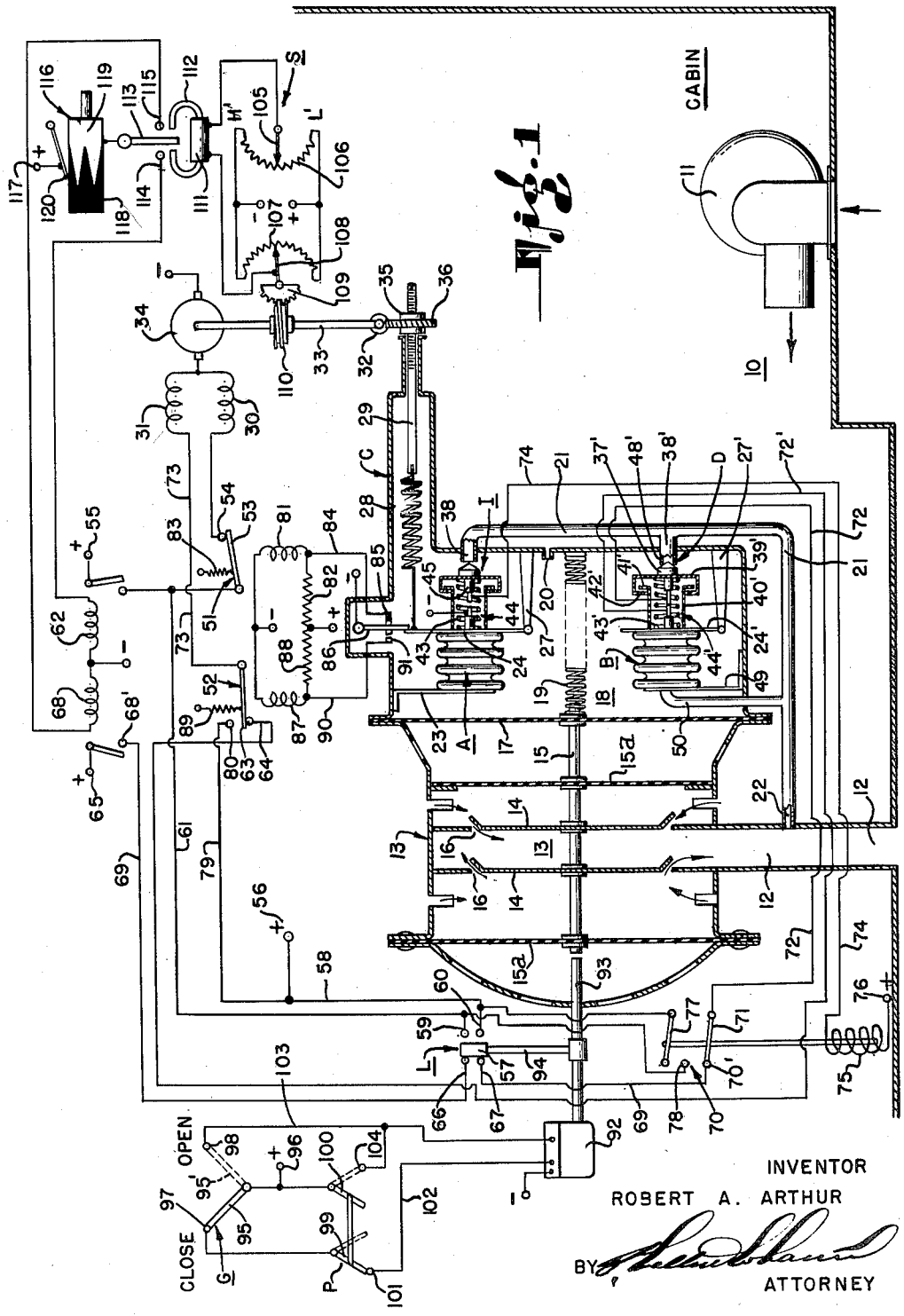
Fig. 1 is a schematic view showing a preferred embodiment of the invention.

In Fig. 1 I show a portion of a compartment or aircraft cabin 10 into which air is fed from the exterior by a blower or compressor 11. The cabin 10 is provided with an outlet opening 12, the flow of air through which is controlled by a balanced valve 13 comprising a pair of disc shaped closures 14 mounted on an axial shaft 15, said shaft being reciprocably mounted on support spiders or diaphragms 15a, so that the closures can have movement relatively to air ports 16 of the air outlet duct or opening 12. The valve 13 forms part of an automatic pressure regulator and the construction thereof is shown in detail in the copending application of James M. Kemper, Serial No. 613,794, filed August 31, 1945, now Patent Number 2,463,489. The rightward end of the shaft 15 is connected to a diaphragm 17 forming one wall of a control chamber 18. A spring 19, within the chamber 18, urges the diaphragm 17 leftwardly, so that the position of the diaphragm, and therefore, the position of the closure 14 at any time, is determined by cabin air pressure against the leftward face of the diaphragm 17, and the force of the spring 19 and of the pressure of the air within the control chamber 18 against the rightward face of the diaphragm 17.

Pressure within the chamber 18 is independent of cabin pressure and of ambient atmospheric pressure, and is controlled by mechanism within the chamber 18. Air enters the control chamber 18 from the cabin 10 through an inlet orifice 20 and leaves the chamber 18 through an isobaric control valve I or differential control valve D, depending upon the conditions of operation of the aircraft, as will be explained later. Air in the cabin serves merely as a convenient source of air under pressure for replenishing that which may be bled out to amosphere through either of the aforesaid control valves. It will be seen that the force of cabin pressure exerted upon the left face of the diaphragm 17 is equal to the force of the compression spring 19 plus the force of control air pressure within the chamber 18 acting against the right side of the diaphragm. Thus when cabin pressure starts to vary from the set isobaric level, the diaphragm 17 moves leftwardly or rightwardly as may be necessary to maintain balance of pressure acting against opposite sides of the diaphragm 17 and in so doing moves the balanced valve 13 in a manner to maintain the desired pressure within the cabin. Isobaric control valve I and likewise differential control valve D have their ports connected to the ambient atmosphere through a duct 21 having an outlet 22.

The control for the isobaric valve I includes an evacuated aneroid bellows A, the leftward end of which is supported by a bracket 23, and the rightward or moving end of which is connected to a lever 24, having its lower end 25, as shown in Fig. 2, connected by pivot means 26 to a fixed bracket 27. Instead of employing a spring within the bellows A, a tension spring 28 is connected to the upper end of the lever 24, so as to apply a force tending to resist compression of the bellows A by pressure in the chamber 18. The tension in the spring 28 is adjusted by longitudinal movement of a rod 29 by a nut 35 which is threaded on the outer end of the rod 29. The nut 35 has thereon a gear 36 adapted to be rotated by a worm 32 driven through a shaft 33 by a motor 34 of reversible type and having opposed directional field windings 30 and 31. When the motor is electrically energized through the winding 30, the shaft 33 will be rotated in a direction to accomplish leftward movement of the rod 29 and reduction of tension in the spring 28.

As shown in detail in Fig. 2, the isobaric valve I comprises a conical closure 37 to cooperate with the valve port 38. This closure 37 is secured to the outer face of a shallow cup member 39 which is movably supported on the rightward or outer end of a tubular member 40 which is secured to the lever 24 in a position to extend rightwardly therefrom as viewed in the drawing. A radial flange 41 on the rightward end of the tubular member 40 fits within the cup member 39, and the cup member 39 is provided with an inwardly turned lip 42 overlapping the flange 41 and thereby preventing removal of the cup member 39 from the member 40 and limiting rightward movement of the cup member 39 relatively to the member 40. A spring 43 within the tubular member 40 urges the cup member 39 rightwardly to the limit permitted by the engagement of the lip 42 with the flange 41.

Within the tubular member 40 there is a switch 44 comprising a contact 45 supported within the cup member 39 by an insulator 46, and a contact 47 which is supported on and grounded to the lever 24. These contacts 45 and 47 are normally separated and therefore the switch 44 is open, when the spring 43 holds the cup member 39 at its rightward limit on the tubular member 40. When the expansion of the bellows A moves the lever 24 rightwardly so as to bring the closure 37 into engagement with the seat 48 defining the port 38, so that rightward movement of the cup member 39 is thereby stopped, and the rightward movement of the lever 24 is thereafter continued, the contact 47 will be brought into engagement with the then stationary contact 45, thereby closing the switch 44 for a purpose which will be hereinafter explained.

The differential control valve D is of a construction in many respects similar to the isobaric control valve I; therefore, those parts which are of similar construction will be identified by numerals employed with respect to the isobaric control valve I with prime marks added thereto. The differential control valve D has a conoidal closure 37' arranged for cooperation with a valve seat 48' defining a valve port 38'. The closure 37' is supported by a swingable lever 24', a rightwardly extending tubular member 40' and a shallow cup member 39' which is urged outwardly by a spring 43', there being within the tubular member 40' a switch 44' which differs from the switch 44 shown in Fig. 2 only in that both of the contacts of the switch 44' are insulated from the parts which support the same. A differential bellows B has its leftward end supported within the chamber 18 by bracket 49, and the rightward end of this differential bellows B is connected to the lever 24'. The interior of the bellows B is connected through a tube 50 and the duct 21 with ambient atmosphere.

The control for the airflow means comprising the valve 13 is automatically adjusted under one condition, with relation to the pressure desired within the cabin at a desired time, and under other conditions, is adjusted with relation to ambient air pressure or to an abnormal cabin pressure and/or control chamber pressure. For example, when the aircraft is climbing normally from a zone of relatively high pressure to a zone of lower pressure, the control means, of which the spring 28 is a part, will be adjusted in accordance with the dictates of preselector means, to be hereinafter described, so that a desired pressure in the cabin 10 will be achieved in a predetermined time, even though the aircraft has during such time flown to a higher altitude and therefore lower pressure than exists in the cabin. However, should the cabin pressure be abnormally reduced at this time, for example, by shutting off a blower, a readjustment of the control means will take place with relation to the reduction in pressure in the cabin 10, so that when the blower is again started and air is again fed under pressure into the cabin to build up cabin pressure, there will not be an immediate, implosive increase in cabin pressure, but the cabin pressure will rise in accordance with the functioning of the preselector means until the preselected cabin pressure is reached. On the other hand, should the aircraft descend to a point below the altitude or pressure level for which the control is instantly set, ambient pressure manifested back through ducts 21 and 50 will produce pressure in the control chamber 18 which will adjust the control to a pressure corresponding to the altitude of the aircraft, below the altitude for which the isobaric preselector has been set, so that if the aircraft later ascends rapidly to an altitude higher than that for which the isobaric preselector has been set, a gradual rather than a sudden decrease in cabin pressure will take place until the desired or preselected cabin altitude has been reached.

The control means referred to in the foregoing has as a part thereof the air outlet valve 13, the isobaric control valve I and the previously described parts for controlling the valve I, some of these parts being of changeable correlation so as to accomplish an adjustment of the control valve I. It will be understood that the correlation of parts may be changed in a number of different ways. For example, instead of employing the spring 28 in adjustable relation to the arm 24 as shown, the bracket 23 could be made movable toward and away from the valve seat 48 and thereby accomplish a control of the valve I. Also, the leftward end of the spring 28 could be moved along the lever 24 toward or away from the pivotal connection 26 thereof with the bracket 27, thereby changing the effect of the spring 28 on the bellows A. The changeable correlation of parts in the preferred form of the invention shown consists in the changing of the tension of the spring 28 with relation to the fixed cross sectional area of the bellows A, this being accomplished by axial movement of the rod 29. The motor windings 30 and 31 may be energized respectively through correlation-responsive switches 51 and 52, which switches 51 and 52 are actuated in accordance with correlation and departure from correlation of control parts, as will be later described.

When the moving contact 53 of the switch 51 engages the stationary contact 54, the winding 30 may be energized from a power connection 55 or a power connection 56. For example, if a bridging contact 57 is moved rightwardly from the position in which it is shown in Fig. 1, it will connect contacts 59 and 60 so that current will be carried from the power source 56 through a conductor 58 and a conductor 61 which has communication through the switch 51 with the winding 30. Also, energization of a relay 62 will connect the power source 55 through the switch 51 so as to energize the winding 30 and thereby drive the motor 34 so as to reduce the tension of spring 28. Similarly, when the moving contact 63 of the switch 52 is in engagement with the stationary contact 64, current may be fed to the motor winding 31 from a power source 65, as follows: With the bridging contact 57 in the leftward position thereof, employed during normal pressurized flight to connect stationary contacts 66 and 67, and with the cabin-ambient pressure differential within the prescribed value of the differential control (which includes the differential control valve D), energization of a relay 68 will close a circuit, including conductor 69, contact 66, contact 57, contact 67, stationary contact 70' of a relay 70, moving contact 71, conductor 72, the closed contacts of switch 44', conductor 72', the switch 52 and conductor 73 which connects the moving contact 63 of the switch 52 with the motor winding 31.

As previously explained, with relation to Fig. 2, the contact 47 of the switch 44 is grounded, as shown in Fig. 1, so as to have connection with the negative side of the power source. As shown in Fig. 1, the remaining contact 45 of the switch 44 is connected through a conductor 74 with the electromagnet 75 of the relay 70, which electromagnet 75 has a positive current connection indicated at 76. When the switch 44 is closed, due to expansion of the aneroid bellows A, the electromagnet will be energized, moving the movable contact 71 downwardly out of engagement with the stationary contact 70' and moving a movable contact 77 into engagement with a contact 78, these contacts 77 and 78 then bridging the contacts 60 and 59, so that current will at this time flow from the power source 56 through the switch 51 to the motor winding 30.

Through the conductor 79, the power source 56 is at all times connected with a stationary contact 80. Should the movable contact 63 be raised into engagement with the contact 80, current will flow from the current source 56, to the winding 31.

Control of the moving contacts 53 and 63 of the switches 51 and 52 is accomplished as follows. An electromagnet 81, energized through a resistor 82, will produce a magnetic flux capable of pulling the movable contact 53 downwardly against the tension of a spring 83. However, during normal control conditions, the current which passes through the resistor 82 does not pass through the electromagnet 81, but is shorted or diverted through a conductor 84 and contacts 85 and 86 to ground. An electromagnet 87 is energized through a resistor 88 during normal flight conditions, thereby holding the movable contact 63 down against the pull of a spring 89, to engage the contact 64. However, in order that the electromagnet 87 may at proper times release the contact 63 so that the spring 89 will move it up into engagement with the contact 80, a conductor 90 connects the juncture of the resistor 88 with the electromagnet 87 to a contact 91 which is disposed adjacent the movable contact 86 and oppositely from the contact 85.

The contact 86 is connected to the upper end of the lever 24, so that as this lever 24 is moved rightwardly or leftwardly, the contact 86 will be likewise moved, thereby exercising a control over the switches 51 and 52 which enter into the adjustment of the control C.

The purpose of the switch L, of which the bridging contact 57 is a part, is to provide means whereby the pilot or other person of authority may bring the control C into correspondence with ambient atmospheric pressure. The contact 57 may be moved rightwardly from the position in which it is shown in Fig. 1 into engagement with the contacts 59 and 60 by any desired means, so that the current source 56 will be connected through the conductor 61 with the moving contact 53 of the switch 51. Preferably, means are provided for accomplishing movement of the contact 57 into engagement with the contacts 59 and 60 when the aircraft wheels touch ground, that is, when the weight of the aircraft is placed on the landing gear. In accordance with the foregoing explanation, I provide a jack 92 of electrical motor driven type having an extensible strut 93 having mounted thereon a bracket arm 94 which carries the contact 57. This jack 92 is placed so that the movable strut 93 thereof will be aligned with the shaft 15 which carries the closure, so that when the jack 92 is actuated to move the strut 93 thereof rightwardly, it will force the shaft 15 and the closures 14 rightwardly so as to open the valve 13. At the same time, the rightward movement of the strut 93 will carry the contact 57 into engagement with the contacts 59 and 60.

A landing gear switch G is provided, this landing gear switch having a movable contact 95, at all times connected to a power source 96. This switch G is connected to the landing gear in such a manner that when the aircraft is off the ground, the contact 95 will engage a stationary contact 97. When the aircraft wheels touch the ground so that weight is applied to the landing gear, the movable contact 95 of the switch G is moved into engagement with a stationary contact 98.

A pilot's override switch P is provided having a pair of movable contacts 99 and 100 connected for simultaneous movement. When the contacts of the switch P are in the position thereof shown in full lines, contact 99 engages a stationary contact 101 connected by a conductor 102 with one of the motor terminals of the jack 92. When the switch P is in the position shown in full lines, the switch G may control the forward and reverse movement of the motor of the jack 92. When the contact 95 engages the contact 97, current will be fed from the power source 96 through the reverse winding of the jack 92, thereby retracting the strut 93 of the jack, allowing the valve 13 to close and bringing the contact 57 into engagement with the contacts 66 and 67. When the contact 95 of the switch G is swung into engagement with the contact 98, current will flow from the source 96 through a conductor 103 to the forward motor winding of the jack 92, causing outward movement of the jack strut 93, so that it will shift the closures 14 of the valve 13 into open position, and move the contact 57 into engagement with the contacts 59 and 60. The pilot may shift the switch P into the position indicated by dotted lines, wherein the contact 99 will be moved out of engagement with the contact 101, and the contact 100 will be moved into engagement with a contact 104, having connection with the conductor 103, which furnishes current to the forward motor winding of the jack 92, with the result that regardless of the setting of the landing gear switch G, the jack strut 93 will remain extended, and the air outlet valve of the cabin 10 will remain open, until such time as the pilot desires to close the same.

A cabin altitude selector S and a pulser 116 are provided for gradually changing the setting or adjustment of the control C so that the pressure in the cabin may be brought to a desired value in a predetermined time. The cabin altitude selector S includes a lever or switch 105 arranged to be moved through positions indicating selected cabin altitudes. The switch lever is disposed so as to sweep a resistance 106, in the manner of a potentiometer, the ends of the resistance 106 being connected to the ends of a resistance 107 adapted to be swept by a moving contact lever 108 which is connected to a gear segment 109 arranged to be driven by a worm 110 mounted on or connected to the shaft of the motor 34 so as to be driven thereby. The contact levers 105 and 108 are connected in series with the winding 111 of a polarized switch 112. When opposite electrical potentials are applied to the opposite ends of the resistances 106 and 107, current will flow therethrough, and if the contact levers 105 and 108 are not in exactly the same positions along the respective resistances 106 and 107, there will be a current flow through the winding 111 of the polarized switch 112, the direction of this current flow through the winding 111 being determined by the relative positions of the contact levers 105 and 108, the negative flow of current being outward through the contact lever 105 or 108, which is closest to the source of electrical energy. The upper and lower ends of the resistance 106 are indicated as high and low altitude respectively by the letters H' and L'. When the contact lever 105 is moved upward relatively to the contact lever 108, the moving contact 113 of the polarized switch 112 will move leftward to engage a contact 114 which is connected to the winding of the relay 62. When the contact lever 105 is lowered relatively to the contact lever 108, the current flow through the winding 111 will be such as to cause movement of the contact 113 rightwardly into engagement with the contact 115, which is connected to the winding of the relay 68.

The contact 113 is connected by a pulser 116, comprising a drum switch for intermittently connecting the contact 113 with a current source 117. This pulser has a continuously rotating drum 118 of insulating material having a serrated metal cylindrical contact 119 affixed about the periphery thereof, as shown and continuously connected to the contact 113. A brush 120, which is connected to the power source 117, intermittently engages the serrated metal contact 119 whereby electrical impulses will be transmitted through the contact 113 to the winding of either the relay 62 or the relay 68. During flight within the maximum differential pressure range, actuation of the relay 62 will result in a rotation of the motor 34 to decrease the tension of the spring 28 and swing the contact 108 relatively upwardly, and actuation of the relay 68 via contacts 57, 66 and 67 of the switch L will operate the motor 34 in a direction to increase the tension in the spring 28 and move the contact 108 downwardly. During normal flight conditions wherein isobaric pressure is maintained the member 24 will move back and forth in a range of movement necessary for an operation of the valve I to control the pressure of the air in the control chamber 18. While moving in this range of movement the member 24 will not move far enough to the left to cause switch part 86 to engage contact 91, and will not move far enough to the right to close the switch 44. When, in response to an increase in pressure in the chamber 18, the member 24 moves to the left outside the range of movement referred to in the foregoing the switch comprising parts 85 and 86 will be closed, and when a decrease in pressure in the chamber 18 moves the member 24 rightwardly outside said range of movement, switch 44 will be closed, and in either case of departure of the member 24 from the range of movement, the motor will be energized so as to readjust the spring so that the member 24 will be moved back into the range of movement, at which time the correlation or setting of the parts of the control C will correspond to the simulated cabin pressure existing in the chamber 18.

Examples of the utility of the invention disclosed in Fig. 1 are as follows. Referring to Fig. 3, an aircraft, equipped with the present invention, starts its flight at a point $a$ where atmospheric pressure is fourteen pounds per square inch, an altitude of around 1300 feet, and, as indicated by the continuous line 122, the aircraft flies over terrain including mountains, hills, and valleys, as indicated by the phantom line 123, through the various altitudes indicated in Fig. 3 and continued on Fig. 4, and finally lands at $p$, where the atmospheric pressure is thirteen pounds per square inch with a corresponding altitude of about 3300 feet above sea level. At the point $a$ the aircraft rests upon the ground, so that the moving contact 95 of the switch G is in the position indicated by dotted lines 95' and jack 92 is extended so that the air outlet valve 13 is held open and the contact 57 is disengaged from the contacts 66 and 67 and engages the contacts 59 and 60. Also, when the destination airport is reached the pilot, as a precautionary measure, may actuate the switch P so as to bring the contact 100 into engagement with the contact 104 and disengage the contact 99 from the contact 101. The bridging of the contacts 59 and 60 by the contact 57 subjects the control C to regulation by ambient pressure, for the reason that the contacts 53 and 80 of the switches 51 and 52 are now both connected to the power source 56, and unless the movable contact 86 is disengaged from the contacts 85 and 91, one or the other of the motor windings 30 or 31 will be energized so as to actuate the motor and change the tension in the spring 28 so as to establish a position of the contact 86 between the contacts 85 and 91, disengaged from both of them.

As a further example, the contact 86 is in Fig. 1 shown in engagement with the contact 85 as occurs during normal control when the aircraft is in flight. If, when the aircraft has landed and the valve 13 is opened, the pressure in the chamber 18 is not sufficient to move the switch member 86 leftwardly, against the tension of the spring 28, out of engagement with the contact 85, the electromagnetic winding 81 will remain shorted out so that the contact 53 will engage contact 54, energizing motor winding 30 and driving the motor in a direction to accomplish a reduction in the tension of the spring 28, so that air pressure in the chamber 18, acting on the bellows A, will move the lever 24 leftwardly, thereby moving the contact 86 out of engagement with the contact 85, whereupon the current flow through the resistance 82 will pass through the winding 81, and the contact 53 will be pulled down out of engagement with the contact 54, stopping the motor with the control C adjusted into correspondence with ambient pressure.

By "correspondence" is not meant that the setting of the control C will be exactly that of ambient atmospheric pressure, but that the setting of the control C will be so close to ambient atmospheric pressure that practicality is achieved. In explanation of this, it may be pointed out that when the aircraft is on the ground and the valve 13 is opened, the blower 11 is operated to produce circulation of air through the cabin for ventilating and cooling purposes. There will be a small pressure drop through the ports 16 of the valve 13 and therefore the pressure in the cabin will be slightly greater than ambient pressure. In keeping with this, the dash-line 125, in Figs. 3 and 4, is shown at and adjacent to $a$ slightly below the horizontal portion of the aircraft ambient altitude line 122 extending from $a$ to $b$. As the motor 34 is operated to release the tension in the spring 28, the valve I moves leftward, increasing the outlet opening through the valve port 38 so that air may flow therethrough much more readily than air can flow through the orifice 20 from the cabin 10 into the chamber 18. Therefore, the pressure in the chamber 18 drops to very nearly the equivalent of the ambient pressure. But even at this time, the contact 86 has not moved leftwardly out of engagement with the contact 85, so that when disengagement of the contact 86 from the contact 85 finally occurs, the tension in the spring 28, i. e., the setting of the control C, is at a relative position slightly less than that equivalent to ambient pressure, as indicated by the dotted lines 126, positioned above the continuous line 122, from $a$ to $b$.

At or before take-off, the pilot preselects his cabin or isobaric altitude, at least for the first part of the flight. For example, he may set the lever contact 105 for an altitude corresponding to a pressure of ten pounds per square inch, or about 10,300 feet altitude, as indicated by the characteristically formed line 127. At this time, the follow-up lever contact 108 will be in a position corresponding to the setting of the control C. That is to say, it will be positioned near the lower end of the resistance 107. Negative current will flow out through the contact lever 105 and through the circuit including the winding 111 of the polarized switch 112, causing the movable contact 113 to move into engagement with the contact 114, thereby closing the relay 62. However, no current will at this time flow through the winding 30, for the reason that the energization of the electromagnet winding 81 will hold the contact 53 down out of engagement with the contact 54, thereby breaking the circuit from the current source 55 through the motor winding 30.

The pilot may spend some time after he has set the preselector S in taxiing and warming up. During this time, the valve 13 is maintained in open position, and as long as the aircraft remains on the ground, the pressure in the cabin and the setting of the control C will not change. At $b$, however, the pilot takes off and ascends rapidly to $c$. As the aircraft ascends from $b$ toward the point $b'$, ambient pressure will drop and therefore the pressure in the chamber 18 will drop, causing the bellows A to expand and permitting the tension in the spring 28 to move the contact 86 rightward into engagement with the contact 85, thereby shorting out the winding 81 so as to release the contact 53 which will engage contact 54 and effect a flow of current from the source 56 through the motor winding 30, so as to actuate the motor 34 in a direction to further release the tension in the spring 28 until the contact 86 is out of engagement with the contact 85. This sequence of effects will continue as the aircraft ascends along the path $b$—$c$ and therefore the pressure in the cabin 10 and the setting of the control C will follow the decrease in ambient pressure until such time as the jack 92 is actuated so as to retract its strut 93. When the pilot reaches a selected elevation, for example, one thousand feet above the take-off point $a$, as indicated at $b'$, he actuates his override switch P by swinging the switch levers 99 and 100 thereof leftwardly into the full line positions in which they are shown, thereby energizing the motor of the jack 92, so as to retract the strut 93 of the jack and move the contact 57 away from engagement with the contacts 59 and 60 and into engagement with the contacts 66 and 67.

The movement of the contact 57 away from the contacts 59 and 60 will disconnect the power source 56 from the contact 53 of the switch 51. Therefore, the relay 62 takes over control of the feeding of electrical current to the motor winding 30. In view of the fact that the intermittent contact drum switch 118 is disposed in series with the power source 117 and the winding of the relay 62, the relay 62 will be intermittently closed so that current from the source 55 will be fed intermittently or in pulses to the motor winding 30, thereby accomplishing a relatively slow decrease in the tension in the spring 28 so that the adjustment of the control C toward the lower pressure of ten pounds per square inch (10,300 feet in altitude) will be at a rate which will not produce personal discomfort nor unsatisfactory physiological reactions, as will be recognized from the slope of the dotted line 125 from $b'$ to $c'$. It will be remembered that as the adjustment of the control C is being made, the rotation of the motor shaft will swing the follow-up switch lever 108 upward so that it will eventually reach a position corresponding to the setting of the contact lever 105. At this time, the resistance bridge will be balanced and the flow through the winding 111 of the polarized relay 112 will stop or be reduced to such low value as to release the contact 113 from its engagement with the contact 114, and contact 113 will move into centralized position. The control setting and cabin pressure will then level off from $c'$ to $d'$ at a pressure of ten pounds per square inch in accordance with the preselector setting 127.

In order to pass over the mountain peak 128, the pilot may ascend from $d$ to $e$. The differential valve D, under control of the differential bellows B, establishes the differential between actual cabin pressure and ambient atmospheric pressure that must not be exceeded. This pressure differential varies with the structural characteristics of the aircraft. Ordinarily, it may be from two and one-half to eight and one-half pounds per square inch. In the present instance, for example, two and one-half pounds per square inch has been adopted as the pressure differential. This pressure differential, therefore, is represented by the horizontal line 129 representing an altitude corresponding to a pressure of seven and one-half pounds per square inch, which is two and one-half pounds less than the cabin pressure of ten pounds per square inch between the points $c'$ and $d'$. During the ascent of the aircraft from $d$ to $e$, the reduced ambient pressure applied internally of the bellows B through the tube 50 starts a relaxation or contraction of the bellows B, so that when the aircraft reaches and passes above the altitude represented by the line 129, the switch 44' and the differential valve D open. The air in the control chamber 18 is thus varied in a manner such that cabin pressure exerted against the leftward face of this diaphragm 17 will open the valve 13 and bleed air from the cabin 10 so that cabin pressure will reduce from $d'$ to $e'$, paralleling the decrease in ambient atmospheric pressure from 130 to $e$. Thereby, cabin pressure is maintained at the differential over ambient pressure of two and one-half pounds per square inch, which is characteristic of the differential control in the example selected.

The reduction in pressure in the control chamber 18 during climb from 130 to $e$ will effect a parallel adjustment of the control setting indicated by dotted line 126. This reduction in pressure results in expansion of the aneroid bellows A so that the valve closure 37 of the isobaric valve I engages the seat 38, stopping rightward movement of the cup member 39 so that continued rightward movement of the tubular member 40 will bring the grounded contact 47 into engagement with the contact 45 to energize the electromagnet 75. Energization of the electromagnet 75 will move the contact 77 into engagement with the contact 78, and also move the contact 71 out of engagement with the contact 70'. Current will now flow downward from the current source 56 through contacts 77 and 78 and then through conductor 61 and the switch 51 to the motor winding 30, driving the motor 34 in a direction to further release tension in the spring 28 so as to adjust the control C for a lower pressure. In this manner, the electrical switch means 44 causes the setting of the control C to follow cabin pressure from the point $d'$ to the point $e'$ and when $e'$ is reached, the relaxation of the spring 28 will have permitted opening of switch 44, deenergization of electromagnet 75 and return of contact 71 to engagement with contact 70', but contact at 44' is still broken so the motor 34 cannot yet start running downwardly. When the aircraft starts to descend from the point $f$, the differential control valve D will cause a descent of cabin pressure from $f'$ to $g'$ until the isobaric pressure level of ten pounds of pressure per square inch is reached, at which time cabin pressure will level off as indicated between the points $g'$ and $h'$.

Attention must now be called to the fact that when the control is adjusted upwardly from $d'$ to $e'$, the contact lever 108 will be moved upwardly along the resistance 107 so that it will be positioned above the contact lever 105. This will result in a negative current flow out through the contact lever 108 so that the contact 113 of the switch 112 wil be swung rightwardly to engage the contact 115 and the pulser 116 will then deliver current impulses through the winding of the relay 68, intermittently closing the switch of this relay. However, current cannot flow from the power source 65 through the conductor 69 and through the switch 52 to the winding 31 for the reason that the circuit from the current source 65 will be broken at this time by separation of the contacts of the switch 44'. Therefore, the closing of the relay 68 cannot energize the winding 31 to cause a driving of the motor 34.

However, after the control C has been adjusted from the higher pressure at $d'$ to the lower pressure $e'$, the switch 44 will open, thereby deenergizing the electromagnet 75 and bringing the contact 71 into engagement with the contact 70'. Then, the circuit from the power source 65 to the motor winding 31 will be broken only at the switch 44' associated with the differential valve D. When the aircraft descends from $f$ toward $h$, there will be an increase in ambient pressure and as the aircraft crosses the differential datum 129, the differential valve D will be closed and switch 44' will be closed, thereby closing the circuit which leads from the contact 68' to the winding and therefore the intermittent actuation of the relay 68 will result in the delivery of electrical impulses through the switch 52 to the winding 31. Energization of the winding 31 will adjust the control C toward greater pressure and at the same time, the action of the worm 110 and the gear 109 will be to move the contact lever 108 downward to a point where the current flow through the winding 111 of the polarized relay 112 will be reduced to such a value as to release the contact 113, stopping the driving of the motor 34 with the position of the contact lever 108 corresponding to the position of the contact lever 105 and with the adjustment of the control C corresponding to the set isobaric pressure indicated by line 127.

An additional feature of the invention is the function of the switch contacts 86 and 91 when the aircraft drops below the isobaric level 127, for example, from $h$ to $i$, as indicated. An increase in ambient pressure is accompanied by an increase in the pressure in the chamber 18 and in the cabin as follows: the spring 28, being set for the isobaric level indicated by line 127 will yield as the increase in pressure in the control chamber 18 decreases the volume of the aneroid bellows A and moves the lever 24 leftward. The leftward movement of the lever 24 carries the contact 86 leftward so that it will be brought into engagement with the contact 91, shorting out the winding 87 and permitting the contact 63 of the switch 52 to rise into engagement with the contact 80, a flow of current from the source 56 and through the motor winding 31 then driving the motor 34 in a direction to increase the tension in the spring, pull the contact 86 rightward from engagement with contact 91, and adjust the control C downward into correspondence with ambient pressure. Accordingly, not only will cabin pressure drop from $h'$ to $i'$, as the aircraft descends from $h$ to $i$, but the control C will be likewise adjusted downwardly from $h'$ to $i'$, so that in the event that the aircraft makes a quick climb from a sub-isobaric region to a super-isobaric region, as from $j$ to $k$, there will not be a sudden drop in cabin pressure, but cabin pressure will be decreased gradually from $j'$ to $k'$ at the predetermined physiologic rate characteristic of the pulser 116.

How this control of the decrease of cabin pressure from $j'$ to $k'$ is accomplished may be explained as follows. When the control C is adjusted from the pressure at $h'$ to the greater pressure at $i'$, the contact lever 108 will be moved into a position below that of the contact lever 105, this resulting in movement of the contact 113 of the switch 112 into engagement with the contact 114 to deliver impulses through the winding of the relay 62. Then, as the aircraft ascends from $j$ toward $k$, the decrease in pressure in the control chamber 18, as the result of decrease of ambient pressure will result in expansion of the aneroid bellows A and a movement of the contact 86 into engagement with the contact 85, thereby shorting out the winding 81 and releasing the contact 53 so that it will engage the contact 54 to permit electrical impulses resulting from the intermittent closing of the relay 62 to flow through the motor winding 30, periodically driving the motor 34 so as to gradually decrease the tension in the spring 28 and adjusting the control C to the isobaric level indicated by the line 127 at $k'$. At this time the contact lever 108 will be again moved upwardly into a position corresponding to the position of the contact lever 105 to release the contact 113 of the switch 112 and discontinue the adjustment of the control C when the isobaric level is reached. The cabin pressure under control of the valve 13, which in turn is controlled by the pressure in the control chamber 18, rises accordingly at a physiological rate to the isobaric level 127.

Fig. 4 shows a continuation of the flight started in and continued through Fig. 3. Starting from the left of Fig. 4, the aircraft continues rightwardly above the isobaric level 127 to the point $l$, at which time the pilot starts to descend toward his contemplated landing at $p$. At point $m$ he elects to reset the isobaric selector to the lowered level of the landing $p$, this being indicated by the reduced isobaric setting indicated at 127' and accomplished by movement of the contact lever 105 downward along the resistance 106 to the position corresponding to the atmospheric pressure existing at $p$. Since in flight conditions between $k'$ and $n$, the contact 86 rests in engagement with the contact 85, and is disengaged from the contact 91, the electromagnetic winding 87 will be energized so that the contact 63 of the switch 52 will be in engagement with the contact 64, the downward adjustment of the contact lever 105 with relation to the position of the contact lever 108 will result in an energization of the polarized switch which will result in movement of the contact 113 into engagement with the contact 115, so that electrical impulses will energize the electromagnet of the relay 68 and the resultant periodic closing of the relay 68 will feed current impulses from the source 65 through the winding 31 to intermittently rotate the motor 34 in a direction to gradually increase the tension in the spring 28 and gradually adjust the control downward to the new isobaric level 127' at $m$. The cabin pressure follows the adjustment of the control down from the point $m$ to the point $n$ as indicated and thereafter the cabin pressure remains at the same presure as the landing point $p$, even though the aircraft may continue at the elevation indicated. Since cabin pressure has been brought down (increased) gradually from $m$ to $n$, on the isobaric level 127', without discomfort to the passengers, the pilot may thereafter descend very rapidly from the point $o$ to the landing place $p$, without discomforture of the passengers. When the aircraft lands, its weight on the landing gear causes the contact 95 of switch G to move into the position 95', engaging contact 96 and conducting current through the motor of the jack 92 to extend the strut 93, thereby opening the valve 13 and carrying the contact 57 into engagement with the contacts 59 and 60, subjecting the control C to regulation by and in correspondence to ambient atmospheric pressure.

In the form of the invention shown in Fig. 1, the spring 28 comprises one of the parts existing in changeable correlation to other parts and accomplishing its function by changes in the tension thereof. In the form of the invention shown in Fig. 5, I employ a control C' which is in a general way the equivalent of the control C of Fig. 1, but changes the correlation of control parts by moving the base 23' on which the aneroid bellows A' is supported, there being means for shifting this base 23' upwardly or downwardly so as to effect a change in the correlation of parts of the control. In Fig. 5 most of the electrical equipment described with relation to Fig. 1 is employed, and such equipment is designated by the same numerals as employed in Fig. 1, so as to avoid necessity of repetition of description. In order to arrange the electrical diagram in the allotted space, the parts appearing in the upper right hand corner of Fig. 1 have been swung 90° in clockwise direction.

In Fig. 5 I show the motor 34 having directional windings 30 and 31 which are connected to contacts 54 and 63 of relays 51 and 52, the windings 81 and 87 of which are connected to a positive source of electric current through resistors 82 and 88, so that when a moving contact 86, which is connected to a negative ground, engages a contact 85, the current which ordinarily passes through the winding 81 will be diverted through a conductor 84, thereby permitting the movable contact 53 of the relay 51 to move into engagement with the contact 54. When the contact 86 engages the contact 91, the winding 87 of the relay 52 will be shorted through a conductor 90, releasing the contact 53 of the relay 52 so that it will move away from the contact 64 into engagement with the contact 80.

As further shown in Fig. 5, the reversible motor 34 drives an adjusting nut 35' which has thereon a bevel gear 36' arranged to be driven by a bevel pinion 32' which is rotated by the shaft 33. The shaft 33 carries a worm 110 which engages a segment 109 adapted to swing the contact lever 108 along a resistance 107, which is connected to a resistance 106 arranged to be traversed by a contact lever 105 of the preselector S. The contact levers 105 and 108 are connected in series with the winding 111 of a polarized relay 112 having a movable contact 113 connected to a current source 117 through a pulser 116, and being arranged to engage contacts 114 and 115 which are respectively connected to the windings of the relays 62 and 68. Closing of the relay 62 connects a source of electric current with the movable contact 53 of the relay or switch 51, and closing the relay 68 connects the source of electric current 65 with the contact 64 of the relay 52 through switch means comprising contacts 66 and 67 adapted to be bridged by a contact 57. A source of positive current 56 is connected to the contact 80 of the relay 52 by a conductor 79. From this current source 56, a conductor 58' extends to a contact 60 arranged adjacent a contact 59 which is connected to the contact 53 of the relay 51 through a conductor 61.

In the form of the invention shown in Fig. 5, the jack 92 is omitted, and as a means for connecting the interior of the cabin 10 to the ambient atmosphere, a dump valve 14' is provided which may be selectively opened and closed by the pilot. Ordinarily, when the plane lands and is standing upon the ground, the pilot opens this dump valve 14' and does not close it until after he has caused the aircraft to start its ascent. The contact 57 is connected to the dump valve 14', as schematically indicated by an insulator 6, in such a manner that when the dump valve 14' is closed, the contact 57 will bridge the contact 66 and contact 67 and when the dump valve 14' is open, will move out of engagement with the contact 66 and contact 67 and bridge the contacts 59 and 60. In the form of the invention shown in Fig. 5, the switches 44 and 44' are omitted.

The cabin pressure regulating valve 140 of Fig. 5 includes a conical closure 141 arranged for vertical movement with relation to a diffuser type air outlet opening 142. The closure 141 is secured on the lower end of the vertical shaft 143, the upper end of which is connected to a diaphragm 144, the lowering and raising of the diaphragm 144 effecting similar movement of the closure 141. The lower face of the diaphragm 144 is subjected to cabin pressure through an opening 145, and the upper face of the diaphragm 144 is subjected to reduced air pressure existing in the chamber 146 as the result of the withdrawal of air through a passage 147 under control of a valve device 148, comprising a vertically movable body 149 having an axial valve port 150, and a pin 151 which is moved vertically by the plate 152' secured to the upper end of the bellows A', and serves as a closure for the port 150. A tube 152 connects ambient atmosphere with a passage 153 which is in communication with the lower face of the valve body. Expansion and contraction of the aneroid bellows A, under the influence of cabin pressure, to which it is directly exposed, moves the valve pin 151 with relation to the valve port 150 and thereby controls the pressure in the chamber 146 above the diaphragm 144 by controlling the outflow of air through the passage 147 and the tube 147' to the tube 152 which is connected to ambient atmosphere. A fulcrumed lever 154 connects the upper end of the valve body 149 with a vertically moving valve stem 155, which extends through a differential control chamber 156 connected to ambient atmospheric pressure through a tube 157, this stem 155 having therein an axial passage 158 which connects the chamber 156 with the lower end face of the stem 155. A spring pressed piston 159 is disposed in the lower part of the chamber 156 and the lower face of this piston 159 is subjected to cabin pressure through a passage 160 leading inward from the opening 145 which communicates with the cabin interior. Cabin-ambient differential pressure changes raise and lower the piston 159, and this piston 159 serves as a stop for limiting downward movement of the stem 155. Should the lower end of the stem 155, which ordinarily rests on the upper end of the shaft 143, be raised from the upper end of the shaft 143 by the piston 159, the ambient atmospheric pressure existing in the chamber 156 will be transmitted through the axial passage 158 of the stem 155 to the chamber 146, thereby raising the diaphragm 144 and bringing the upper end of the shaft 143 into engagement with the lower end of the stem 155. In this manner, when the cabin pressure exceeds ambient atmospheric pressure by an amount greater than the pressure differential for which the equipment is designed, the valve closure 141 will raise, allowing the excessive cabin pressure to escape to the ambient atmosphere and be reduced to the safe level.

The switch contact 86 of Fig. 5 is connected for movement by the plate 152' at the upper end of the bellows A through a lever 162 fulcrumed on a hinge pin 163 so that the inner end will engage a portion of the plate 152' near the center thereof. The contact 86 is shown affixed to the outer end of the lever 162 by an insulator 164.

With regard to the operation of the device shown in Fig. 5, it will be observed that when the dump valve 14 is open, the contacts 59 and 60 will be bridged by the contact 57 and current from the positive source 56 will flow through conductors 58' and 64 to the contact 53 of the relay 51, thereby energizing the motor winding 30 to operate the motor 34 and rotate the nut 35 in a direction to lower the screw 29, thereby lowering the aneroid bellows A a distance sufficient to result in a counterclockwise rotation of the lever 162 which will move the contact 86 out of engagement with the contact 85, thereby adjusting the control G into correspondence with ambient pressure. Closing of the dump valve 14 after ascent of the aircraft causes contact 57 to leave contacts 59 and 60 and bridge contacts 66 and 67, thereby placing the control system in condition for control under supervision of the preselector S.

It should be noted in conjunction with the device depicted in Fig. 5 that this modification of the invention has been applied to a bellows A' which, as intimated above, is somewhat different in the manner of its control from bellows A shown in Fig. 1. In the device of Fig. 5, the bellows A' is exposed directly to cabin pressure and therefore is sensitive to cabin pressure and moves in accordance with variations therein. In the device of Fig. 1, bellows A is not sensitive to cabin pressure but to the pressure within the control chamber 18. The instantaneous pressure within the control chamber 18 is a measure of cabin pressure, however, since the diaphragm 17 moves in response to that pressure, and tends to vary the chamber pressure. The device represented in Fig. 1 is the preferred form of control, since it is more responsive to variations in cabin pressure than that of Fig. 5, for the reason that the outflow valve 13 is directly connected to the cabin pressure responsive element, diaphragm 17. This does not, however, affect the utility of the invention, for it may, as will be apparent to those skilled in the art, be applied to many different types of cabin pressure controls.

I claim as my invention:

1. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to adjust said airflow means so as to effect through said airflow means a desired pressure of air in the cabin; said control means having control parts of adjustable correlation, the instant correlation of said parts determining the instant adjustment of said airflow means; adjusting means operative to change the correlation of said control parts so as to obtain a different adjustment of said airflow means; an overriding control having means sensitive to air pressure and being operative to bring the instant correlation of said control parts into a condition of correspondence with ambient air pressure; a control member operative independently of said adjusting means and being movable between first and second position; and means operating in response to movement of said control member into the first position thereof to render said overriding control means inactive and operating in response to movement of said control member into said second position thereof to effect operation of said overriding control.

2. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to effect through said airflow means a desired pressure of air in said cabin, said control means having control parts of adjustable correlation, at least one of which parts is responsive to the changes in pressure of cabin air, the instant correlation of said parts determining the instant adjustment of said airflow means; isobaric pressure changing means for changing the correlation of said control parts so as to obtain a different adjustment of said airflow means; an overriding control having means sensitive to air pressure and instrumentalities operative to effect operation of said pressure changing means which will bring the instant correlation of said control parts into a condition representing a value of air pressure in said cabin having a predetermined relation to ambient air pressure; differential control means for limiting the increase of pressure of air in the cabin over the pressure of ambient air; a control member movable between first and second position; and means operating in response to movement of said member into the first position thereof to render said overriding control inactive and operating in response to movement of said member into said second position thereof to effect operation of said overriding control.

3. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to effect through said airflow means a pressure of air in said cabin within the pressure range for which said control means is set, said control means having control parts of adjustable correlation, the instant correlation of said parts determining the instant adjustment of said airflow means; means operative to change the correlation of said control parts so as to obtain a different adjustment of said airflow means; an overriding control operative to bring the instant correlation of said control parts into a condition of correspondence with ambient air pressure; means for activating said overriding control; and means having an air pressure sensitive element and cooperating instrumentalities operating in response to the pressure of the cabin air when the pressure of the cabin air drops below the pressure for which said control means is set to change the correlation of said control parts so that the setting of said control means will be then for a pressure corresponding to the pressure of air in the cabin.

4. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to effect through said airflow means a pressure of air in said cabin within the pressure range for which said control means is set, said control means having control parts of adjustable correlation, the instant correlation of said parts determining the instant adjustment of said airflow means; means operative to change the correlation of said control parts so as to obtain a different adjustment of said airflow means; and means having an air pressure sensitive element and cooperating instrumentalities operating in response to the pressure of the cabin air when the pressure of the cabin air drops below the pressure for which said control means is set to change the correlation of said control parts so that the setting of said control means will be then for a pressure corresponding to the pressure of air in the cabin.

5. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to adjust said airflow means so as to effect through said airflow means a desired pressure of air in said cabin; an isobaric adjuster connected to said control means and operative to adjust said control means to a setting which will effect a desired isobaric pressure in said cabin; supplementary adjusting means responsive to air pressure to adjust said control means to a setting having a direct relation to said air pressure; means acting when said adjusting means is in operation to render said isobaric adjuster inoperative; and means for effecting starting and stopping of the operation of said adjusting means.

6. In apparatus for controlling the pressure of air in an aircraft cabin or compartment having at least one opening for the flow of air which flow determines the said pressure, the combination of: airflow means adjustable so as to effect different flows of air through said opening and thereby produce different pressures in said cabin; control means for said airflow means operating to adjust said airflow means so as to effect through said airflow means a desired pressure of air in said cabin; an isobaric adjuster connected to said control means and operative to adjust said control means to a setting which will effect a desired isobaric pressure in said cabin; adjusting means responsive to ambient air pressure to adjust said control means to a setting having a direct relation to said ambient air pressure; means acting when said adjusting means is in operation to render said isobaric adjuster inoperative; and means operatively associated with said control means and being subjected to an air pressure corresponding to cabin air pressure, operating when said corresponding air pressure has a value deviating a prescribed amount from the instant setting of said control means to adjust said control means so that the setting thereof will have a value within a prescribed range of said corresponding air pressure.

7. In apparatus for controlling the pressure of air in an aircraft cabin or compartment having at least one opening for the flow of air which flow determines the said pressure, the combination of: airflow means adjustable so as to effect different flows of air through said opening and thereby produce different pressures in said cabin; control means for said airflow means operating to effect through said airflow means a desired pressure of air in said cabin; an isobaric adjuster connected to said control means and operative to adjust said control means to a setting which will effect a desired isobaric pressure in said cabin; differential control means adapted to override said isobaric adjuster; and supplementary adjusting means operatively associated with said control means and comprising air pressure sensitive element subjected to an air pressure corresponding to cabin air pressure, and being adapted when said corresponding air pressure drops to a lowered pressure having a predetermined value below the value of the instant setting of said control means to adjust said control means so that the setting thereof will have a lowered value related to said lowered pressure.

8. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin, said airflow means comprising a control chamber having a port to receive air from the cabin and a port for delivering air from said chamber to a zone of pressure lower than cabin pressure and means responsive to changes in pressure in said chamber to change the flow of air through said opening; control means for said airflow means operating to effect through said airflow means a desired pressure of air in said cabin, said control means having control parts of adjustable correlation, said parts comprising a valve for one of said ports and air pressure sensitive means for operation of said valve, the instant correlation of said parts determining the pressure in said control chamber and therefore the instant adjustment of said airflow means; means operative to change the correlation of said control parts so as to obtain a different adjustment of said air flow means; an overriding control operative to bring the instant correlation of said control parts into a condition of correspondence with ambient air pressure; and means for activating said overriding control.

9. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to effect through said airflow means a desired pressure of air in the cabin, said control means having control parts of adjustable correlation, the instant correlation of said parts determining the instant adjustment of said airflow means; means operative to adjust said control parts so as to change the correlation of said control parts so as to obtain a different adjustment of said airflow means; an overriding control operative to adjust said control parts so as to change the instant correlation of said control parts to a condition of correspondence with ambient air pressure; means for activating said overriding control; and a second overriding control operating when a predetermined pressure differential of cabin pressure over ambient pressure is exceeded to change the correlation of said control parts and accomplish an adjustment of said control means to a value which is within a predetermined differential from the instant ambient pressure.

10. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to effect through said airflow means a desired pressure of air in said cabin, said control means having control parts of adjustable correlation, at least one of which parts is air-pressure sensitive and responsive to the changes in pressure of cabin air and is movable from a position within a range of movement to a position outside said range of movement, the instant correlation of said parts determining the instant adjustment of said airflow means; isobaric pressure changing means for changing the correlation of said control parts so as to obtain a different adjustment of said airflow means; and an overriding control adapted to effect operation of said pressure changing means which will bring the instant correlation of said control parts into a condition of correspondence with ambient air pressure, said overriding control having means operative in response to movement of said air pressure sensitive part into a position outside said range of movement to activate said overriding control.

11. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to effect through said airflow means a desired pressure of air in said cabin, said control means having control parts of adjustable correlation, at least one of which parts is air pressure sensitive and responsive to the changes in pressure of cabin air and is movable from a position within a range of movement to a position outside said range of movement, the instant correlation of said parts determining the instant adjustment of said airflow means; regulating means for changing the correlation of said control parts so as to obtain a different adjustment of said airflow means; an overriding control adapted to effect change of the correlation of said control parts into a condition of correspondence with instant cabin air pressure; and means operative in response to movement into a position outside said range of said one of which parts is responsive to changes in pressure of cabin air for activating said overriding control.

12. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to effect through said airflow means a desired pressure of air in said cabin, said control means having control parts of adjustable correlation, at least one of which parts is air pressure sensitive and responsive to the changes in pressure of cabin air and is movable from a position within a range of movement to a position outside said range of movement, the instant correlation of said parts determining the instant adjustment of said airflow means; regulating means comprising an electric motor and motor driven means for changing the correlation of said control parts so as to obtain a different adjustment of said airflow means; and an overriding control for effecting an electrical energization of said motor which will drive said motor driven means in a direction to bring the correlation of said control parts into a condition of correspondence with instant cabin air pressure, said overriding control including current control means for said motor and means connecting said current control means to said one of said control parts so that said motor will be operated when said last named control part is moved outside said range of movement.

13. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin, said airflow means comprising a control chamber having a port to receive air from the cabin and a port for delivering air from said chamber to a zone of pressure lower than cabin pressure and means responsive to changes in pressure in said chamber to change the flow of air through said opening; control means for said airflow means operating to effect through said airflow means a desired pressure of air in said cabin, said control means having control parts of adjustable correlation, said parts comprising a valve for one of said ports and air pressure sensitive means for operation of said valve, the instant correlation of said parts determining the pressure in said control chamber and therefore the instant adjustment of said airflow means, said air pressure sensitive means being arranged with relation to said valve so as to move within a normal range of movement during normal control of cabin pressure; means operative to change the correlation of said control parts at a relatively slow rate so as to obtain a different adjustment of said airflow means; and means set in action in consequence of the movement of said air pressure sensitive means outside said normal range of movement for adjusting the correlation of said control parts so as to bring said air pressure sensitive means back into said normal range of movement.

14. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin, said airflow means comprising a control chamber having a port to receive air from the cabin and a port for delivering air from said chamber to a zone of pressure lower than cabin pressure and means responsive to changes in pressure in said chamber to change the flow of air through said opening; control means for said airflow means operating to effect through said airflow means a desired pressure of air in said cabin, said control means having control parts of adjustable correlation, said parts comprising a valve for one of said ports and air pressure sensitive means for operation of said valve, the instant correlation of said parts determining the pressure in said control chamber and therefore the instant adjustment of said airflow means, said air pressure sensitive means being arranged with relation to said valve so as to move within a normal range of movement during normal control of cabin pressure; supplementary means set in action in consequence of the movement of said air pressure sensitive means outside said normal range of movement for adjusting the correlation of said control parts so as to bring said air pressure sensitive means back into normal range of movement; a preselector adapted to be set for a pressure desired in the aircraft cabin; and means operating under control of said preselector when said air pressure sensitive means is within said normal range of movement to adjust said control parts into a correlation corresponding to the setting of said preselector.

15. In a control of the character described having air pressure controlling parts which are adjusted by pressure of air: walls forming a control chamber in which a controlling air pressure is to be maintained, said chamber having an inlet opening for connection to a source of air under pressure and an outlet opening for connection to a zone of lower pressure; regulating means for controlling the flow of air through one of said openings, said regulating means comprising adjustably related parts one of which is sensitive to pressure of air in said chamber and another of which comprises a valve means for controlling the flow of air through said last named opening, one of said parts being arranged for movement within and outside a prescribed range of movement wherein control of said flow of air through said last named opening is effected by said valve means; switch means adapted to be operated in consequence of the movement of said one of said parts outside said range of movement; and electrical means operative under control of said switch means to adjust said regulating means.

16. In a control of the character described having air pressure controlling parts which are adjusted by pressure of air: walls forming a control chamber in which a controlling air pressure is to be maintained, said chamber having an inlet opening for connection to a source of air under pressure and an outlet opening for connection to a zone of lower pressure; regulating means for controlling the flow of air through one of said openings, said regulating means comprising adjustably related parts one of which is sensitive to pressure of air in said chamber and another of which comprises a valve means for controlling the flow of air through said last named opening, one of said parts being arranged for movement within and outside a prescribed range of movement wherein control of said flow of air through said last named opening is effected by said valve means; switch means adapted to be operated in consequence of the movement of said one of said parts outside said range of movement; electrical means operative under control of said switch means to adjust said regulating means; differential control means having an element exposed to the pressure differential between the interior of the chamber and said source of lower pressure; a switch operating member moved back and forth by said element as said pressure differential changes; and a second means for controlling the operation of said electrical means, having switch means connected so as to be opened and closed by movement of said switch operating member.

17. In a control of the character described having air pressure controlling parts which are adjusted by pressure of air: walls forming a control chamber in which a controlling air pressure is to be maintained, said chamber having an inlet opening for connection to a source of air under pressure and an outlet opening for connection to a zone of lower pressure; regulating means for controlling the flow of air through one of said openings, said regulating means comprising adjustably related parts one of which is sensitive to pressure of air in said chamber and another of which comprises a valve means for controlling the flow of air through said last named opening; pressure differential control means operative to effect a reduced pressure of air in said chamber when the differential pressure between said chamber and said source of lower pressure exceeds a predetermined value; and means adapted to respond to said reduced pressure of air in said chamber to effect an adjustment of said regulating means to a setting having a predetermined relation to said reduced pressure.

18. In a control of the character described having air pressure controlling parts which are adjusted by pressure of air: walls forming a control chamber in which a controlling air pressure is to be maintained, said chamber having an inlet opening for connection to a source of air under pressure and an outlet opening for connection to a zone of lower pressure; regulating means for controlling the flow of air through one of said openings, said regulating means comprising adjustably related parts one of which is sensitive to pressure of air in said chamber and another of which comprises a valve means for controlling the flow of air through said last named openings; pressure differential control means operative to effect a reduced pressure of air in said chamber when the differential pressure between said chamber and said source of lower pressure exceeds a predetermined value; means adapted to respond to said reduced pressure of air in said chamber to effect an adjustment of said regulating means to a setting having a predetermined relation to said reduced pressure; and adjusting means arranged to operate in response to increase in pressure in said chamber to change the setting of said regulating means to a value corresponding to said increase in pressure.

19. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to effect through said airflow means a desired pressure of air in the cabin, said control means having a control chamber for containing air under a control pressure, means for regulating the air pressure in said control chamber having air pressure responsive means moving back and forth within an operating range of movement during a predetermined regulating action; and power means adapted to operate in consequence of movement of said air pressure responsive means to a position outside said operating range of movement to change the pressure of air in said control chamber so as to bring said air pressure responsive means back to said operating range of movement.

20. In apparatus for controlling the pressure of air in an aircraft cabin or compartment having at least one opening for the flow of air, which flow determines the said pressure, the combination of: airflow means adjustable so as to effect different flows of air through said opening and thereby produce different pressures in said cabin; control means for said airflow means operating to effect through said airflow means a desired pressure of air in the cabin, said control means having a control chamber for containing air under a control pressure, means for regulating the air pressure in said control chamber having air pressure responsive means moving back and forth within an operating range of movement during a predetermined regulating action; and power means adapted to operate in consequence of movement of said air pressure responsive means to a position outside said operating range of movement to change the pressure of air in said control chamber so as to bring said air pressure responsive means back to said operating range of movement, said power means being electrically controlled and having current control means, and said air pressure responsive means comprising at least one expansile-contractile member and means connecting it to said current control means so as to actuate the same.

21. In apparatus for controlling the pressure of air in an aircraft cabin or compartment having at least one opening for the flow of air, which flow determines said pressure, the combination of: airflow means adjustable so as to effect different flows of air through said opening and thereby produce different pressures in said cabin; control means for said airflow means operating to effect through said airflow means the selected pressure of air in the cabin, said control means having control parts of adjustable correlation, the instant correlation of said parts determining the instant adjustment of said airflow means; an overriding control operative to bring the instant correlation of said control parts into a condition of correspondence with instant cabin air pressure, said overriding control including in air pressure sensitive member moved back and forth within a range of movement by changes in pressure corresponding to cabin air pressure, and means operated by said member when it is disposed in an actuating position to activate said overriding control, said overriding control being inactive when said last named means is moved away from said position; a preselector adapted to be set for a pressure desired in the aircraft cabin; and means operating under control of said preselector when said override control is inactive to adjust said control parts into correlation corresponding to the setting of said preselector.

22. In apparatus for controlling the pressure of air in an aircraft cabin or compartment having at least one opening for the flow of air, which flow determines said pressure, the combination of: airflow means adjustable so as to effect different flows of air through said opening and thereby produce different pressures in said cabin; control means for said airflow means operating to effect through said airflow means a predetermined pressure of air in the cabin, said control means having control parts of adjustable correlation, the instant correlation of said parts determining the instant adjustment of said airflow means; adjusting means operating in response to a greater air pressure than said predetermined pressure for which said control means is instantly set to adjust said control means to a pressure setting greater than said predetermined pressure; and adjusting means operating in response to a lesser air pressure than said predetermined pressure for which said control means is instantly set to adjust said control means to a pressure setting lesser than said predetermined pressure.

23. In apparatus for controlling the pressure of air in an aircraft cabin or compartment having at least one opening for the flow of air, which flow determines said pressure, the combination of: airflow means adjustable so as to effect different flows of air through said opening and thereby produce different pressures in said cabin; control means for said airflow means operating to effect through said airflow means a predetermined pressure of air in the cabin, said control means having control parts of adjustable correlation, the instant correlation of said parts determining the instant adjustment of said airflow means; adjusting means operating in response to a greater air pressure than said predetermined pressure for which said control means is instantly set to adjust said control means to a pressure setting greater than said predetermined pressure; adjusting means operating in response to a lesser air pressure than said predetermined pressure for which said control means is instantly set to adjust said control means to a pressure setting lesser than said predetermined pressure; and means operative to readjust said control to a setting corresponding to said predetermined pressure.

ROBERT A. ARTHUR.

REFERENCES CITED

The following references are of record in the file of this patent:

UNITED STATES PATENTS

| Number | Name | Date |
|---|---|---|
| 2,396,116 | Noxon | Mar. 5, 1946 |
| 2,424,491 | Morris | July 22, 1947 |
| 2,449,231 | Jerger | Sept. 14, 1948 |
| 2,450,076 | Bechberger | Sept. 28, 1948 |
| 2,450,881 | Cooper et al. | Oct. 12, 1948 |
| 2,451,608 | Borell | Oct. 19, 1948 |
| 2,463,488 | Morris | Mar. 1, 1949 |
| 2,463,489 | Kemper | Mar. 1, 1949 |
| 2,473,776 | Baak | June 21, 1949 |

FOREIGN PATENTS

| Number | Country | Date |
|---|---|---|
| 563,553 | Great Britain | Aug. 21, 1944 |